United States Patent [19]
Rizzon

[11] Patent Number: 5,771,822
[45] Date of Patent: Jun. 30, 1998

[54] PROCESS FOR THE DISPOSAL OF RESIDUAL SUBSTANCES FROM WASTE INCINERATION PLANTS AS WELL AS ACTIVATED COKE AND/OR ACTIVATED CARBON

[75] Inventor: John Rizzon, Rösrath, Germany

[73] Assignee: Metallgesellschaft Aktiengesellschaft, Frankfurt am Main, Germany

[21] Appl. No.: 561,649

[22] Filed: Nov. 22, 1995

[30] Foreign Application Priority Data

Dec. 3, 1994 [DE] Germany ............................ 44 43 088.4

[51] Int. Cl.$^6$ ..................................................... F23G 5/00
[52] U.S. Cl. ...................... 110/346; 110/165 A; 110/259; 110/344
[58] Field of Search .............................. 110/165 A, 259, 110/344, 346; 588/205, 231

[56] References Cited

U.S. PATENT DOCUMENTS

| | | | |
|---|---|---|---|
| 4,915,039 | 4/1990 | Ringel | ..................................... 110/346 |
| 4,978,477 | 12/1990 | Larsen et al. . | |
| 5,057,009 | 10/1991 | Nechvatal et al. | .............. 110/165 A X |
| 5,199,363 | 4/1993 | Cheetham . | |
| 5,259,863 | 11/1993 | Schneider et al. . | |
| 5,402,439 | 3/1995 | Bullmann et al. . | |
| 5,605,104 | 2/1997 | Gross et al. | ..................... 110/165 A X |

*Primary Examiner*—Henry A. Bennett
*Assistant Examiner*—Susanne C. Tinker
*Attorney, Agent, or Firm*—Sprung Kramer Schaefer & Briscoe

[57] ABSTRACT

The present invention describes a process for the disposal of residual substances from waste incineration plants as well as activated coke and/or activated carbon. For this purpose the residual substance as well as activated coke and/or activated carbon is introduced into the annular shaft (3) of the primary chamber (2) of the furnace (1). In the primary chamber (2) a temperature of 1250° C. to 1500° C. is set. The molten material flowing off leaves the primary chamber (2) together with the flue gases through the central outlet (4). The molten material is passed through the secondary chamber (5) and is discharged as slag. The present invention furthermore describes an apparatus for such process, where in the furnace roof (10) of the primary chamber (2) of the furnace (1) one or several burners (7) are disposed and at one or several points (22) of the furnace roof (10) secondary air is introduced into the primary chamber (2) and at one or several points (23) of the furnace roof (10) tertiary air is introduced into the primary chamber (2).

8 Claims, 2 Drawing Sheets

PROCESS FOR THE DISPOSAL OF RESIDUAL SUBSTANCES FROM WASTE INCINERATION PLANTS AS WELL AS ACTIVATED COKE AND/OR ACTIVATED CARBON

The present invention relates to a process and an apparatus for the disposal of residual substances from waste incineration plants as well as activated coke and/or activated carbon.

The waste gas from a waste incineration plant is subjected to a flue gas treatment such as wet scrubbing as well as half-dry and dry processes. In the flue gas treatment, used adsorbent in the form of a dry or humid, fine-grained powder or dust constitutes a residual substance which is loaded with toxic material and heavy metals. To not exceed the low limit values for halogenated dibenzodioxins and dibenzofurans and heavy metals, in particular cadmium, mercury and arsenic, a further cleaning stage is added. For this purpose, fixed-bed hearth furnace coke and activated carbon filters are used. Hearth furnace coke is also referred to as activated coke. What is also common practice are airborne flow processes, where hearth furnace coke, activated carbon or mixtures thereof as well as carrier material such as $Ca(OH)_2$, sorbalit or other inert substances are used. In the subsequent cleaning stage used activated coke and used activated carbon are obtained in particular, which are loaded with toxic substances and heavy metals and are classified as critical special waste. The disposal of such substances is difficult, expensive and therefore very uneconomical. At the moment, the disposal of activated coke and activated carbon is effected by means of heat through incineration in a reactor, for instance in a rotary-tube furnace. Because of the high temperature that has to be applied, this type of disposal is uneconomical.

It is the object of the present invention to provide an economical and environmentally beneficial process for the disposal of residual substances from waste incineration plants as well as activated coke and/or activated carbon, where at low temperatures environmentally acceptable substances are obtained at a reduced volume, which substances can be further processed or disposed of at low costs.

The object underlying the present invention is solved by a process for the disposal of residual substances from waste incineration plants as well as activated coke and/or activated carbon, where a) residual substance from waste incineration plants as well as activated coke and/or activated carbon are introduced into the primary chamber of the furnace, b) a temperature of 1250° C. to 15000° C. is set in the primary chamber, c) the molten material flowing off leaves the primary chamber together with flue gases, the molten material is passed through the secondary chamber and is discharged as slag.

In accordance with the invention, fuels of high calorific value such as oils, gases, carbonaceous solid fuels, e.g. coal, sewage sludge, coke or activated carbon, as well as wastes of high calorific value, e.g. shredded solid wastes, wood wastes, used oils, liquid and pasty special wastes are used for melting purposes.

The process in accordance with the invention has the advantage that at these temperatures combustible constituents and toxic compounds, such as halogenated dibenzodioxins and dibenzofurans, are decomposed. Mineral constituents and heavy metals are converted to a compact, alkali-resistant slag. An environmentally benefical product of reduced volume is obtained, which can be utilized in road construction, in the construction industry and in the refractory industry.

It is a preferred embodiment of the invention that in accordance with process step (b) a temperature of 13000° C. to 1400° C. is set. In this temperature range the best results are achieved for melting residual substances from waste incineration plants.

It is a preferred embodiment of the invention that activated coke and/or activated carbon are admixed to the residual substance untreated, and the mixture is introduced into the primary chamber. This has the advantage that a good burn-up rate is achieved.

It is a preferred embodiment of the invention that activated coke and/or activated carbon are directly introduced into the primary chamber. This has the advantage that a good burn-up rate is achieved and a low carbon content is obtained in the slag. What is even more advantageous is to grind the carbonaceous residual substance and to incinerate the same in the furnace by means of a pulverized-fuel burner.

It is a preferred embodiment of the invention that activated coke and/or activated carbon are comminuted to a grain size<1 mm and are directly blown into the primary chamber via the burner. At this grain size a particulary favorable burn-up rate is achieved.

It is a preferred embodiment of the invention that activated coke and/or activated carbon are mixed with liquid and/or pasty fuels, the mixture is added to the residual substance and together with the residual substance is introduced into the primary chamber, or the mixture is directly introduced into the primary chamber. This leads to particularly favorable results in the melting process.

It is a preferred embodiment of the invention that activated coke and/or activated carbon are added to the residual substance together with additives, and the mixture including the residual substance is introduced into the primary chamber, or the mixture is directly introduced into the primary chamber, where as additives one or several of the melting-point-decreasing substances such as filter and boiler ash from domestic and special waste incineration plants, leaching and jarosite residues, sludges from precipitation, solution, color producing and phosphatizing processes, metallurgical slags, skimmings and dusts, metal and electroplating sludges and dusts, electronic scrap as well as foundry sand are used. These additives lead to a considerable decrease of the melting point.

It is a preferred embodiment of the invention that dried sewage sludge is added to the mixture. This inventive variant provides for the disposal of sewage sludge. Surprisingly, it has turned out that the addition of sewage sludge provides very good results in the melting of residual substances from waste incineration plants.

It is a preferred embodiment of the invention that activated coke and/or activated carbon are mixed with rust ash, and the mixture including the residual substance is introduced into the primary chamber, or the mixture is directly introduced into the primary chamber. This inventive variant provides for the disposal of rust ash. Surprisingly, it has turned out that a mixture of activated coke and/or activated carbon with rust ash can be molten in an energy-saving and very efficient way.

It is a preferred embodiment of the invention that in a magnetic separator rust ash is separated from iron-containing substances, the rust ash separated from iron-containing substances is screened, where a coarse fraction having a grain size>50 mm is separated, and a fine fraction having a grain size<50 mm is introduced into the primary chamber. This provides very good results in the melting of rust ash.

It is a preferred embodiment of the invention that the fine fraction having a grain size<50 mm is screened and a fraction of the rust ash having a grain size of 2 mm to 50 mm is separated and a fraction of the rust ash having a grain size<2 mm is introduced into the primary chamber. This provides the best results in the melting of rust ash. The melting can be performed in an energy-saving way.

It is a preferred embodiment of the invention that an excess-air coefficient of $\lambda=0.7$ to $\lambda=1.3$ is set. This range for the excess-air coefficient provides the best results for the melting of residual substances from waste incineration plants as well as activated coke and/or activated carbon.

It is a preferred embodiment of the invention that in the primary chamber an excess-air coefficient of $\lambda \leq 1$ is set. Under these inventive conditions heavy metals are volatilized to a greater extent.

It is a preferred embodiment of the invention that in the primary chamber an excess-air coefficient of $\lambda \geq 1$ is set. Under these inventive conditions a good burn-up rate is achieved, in particular when fuels of high calorific value are used.

It is a preferred embodiment of the invention that oxygen-enriched air is introduced into the furnace. By using oxygen-enriched air the fuel requirement and the waste gas quantity as well as the $NO_x$ concentration in the waste gas are advantageously reduced.

In accordance with the invention an apparatus for melting residual substances from waste incineration plants is provided, where in the furnace roof of the primary chamber of the furnace one or several burners are disposed and at one or several points of the furnace roof secondary air is introduced into the primary chamber and at one or several points of the furnace roof tertiary air is introduced into the primary chamber. By means of this inventive measure the $NO_x$ concentration in the waste gas is reduced considerably.

A preferred embodiment of the invention is an apparatus where as primary and secondary air oxygen-enriched air is introduced into the primary chamber. This provides the best results as regards the reduction of the $NO_x$ concentration.

In accordance with the invention the use of a furnace for melting residual substances from waste incineration plants is provided.

The invention will subsequently be explained in detail with reference to a drawing and an example.

DRAWING

The drawing includes FIG. 1 and FIG. 2.

Figure 1:
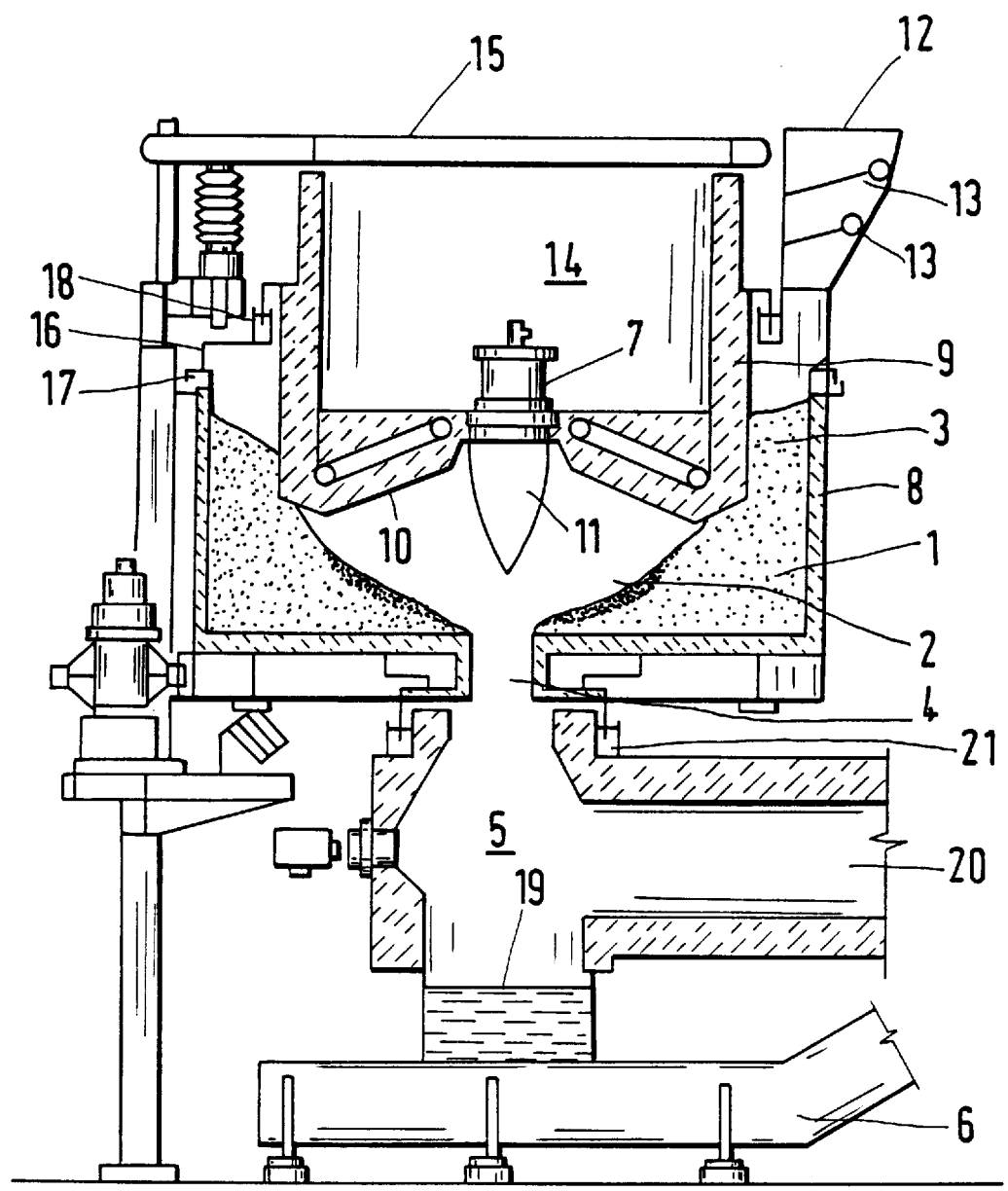
FIG. 1 shows a longitudinal section of a KSMF melting furnace.

In FIG. 1 a surface melting furnace (1), a so-called KSMF melting furnace, is shown. The abbreviation KSMF stands for KUBOTA-Surface-Melting-Furnace. The KSMF melting furnace and the melting process are described for instance in the brochure "KUBOTA Melting Furnace for Sewage Sludge", of the KUBOTA Corporation, Osaka, Japan. The melting furnace (1), also referred to as furnace (1), comprises a cylindrical outer shell (8) in which a cylindrical inner shell (9) is concentrically suspended. The outer shell (8) rotates at 0.5 to 5 r/h. Between the outer shell (8) and the inner shell (9) the annular shaft (3) and the primary chamber (2) are formed. The inner shell (9) can be raised and lowered, whereby the size of the primary chamber (2) and of the annular shaft (3) is adapted to the required capacity. In the interior (14) of the inner shell (9) a burner (7) is centrally disposed, whose flame (11) burns in the primary chamber (2). In the interior (14) of the inner shell (9) one or more burners (7) can alternatively be arranged on a circle, with the flames of said burners burning in the primary chamber (2). The interior (14) is closed with a movable furnace cover (15). For charging the material, the furnace (1) comprises a hopper (12), in which two double swing valves (13) are provided, so that the furnace (1) is protected against the leakage of air into the same. Between the fixed furnace cover (16) and the rotating outer shell (8) as well as the fixed inner shell (9) water seals (17, 18) are provided in accordance with the prior art. At the furnace (1) a further water seal (21) is provided. The water seals (17, 18, 21) provide a gas-tight closure and ensure a quick pressure compensation in the case of a pressure increase. In the bottom of the primary chamber (2) an outlet (4), also referred to as slag outlet, is centrally disposed. The outlet (4) constitutes the communication between the primary chamber (2) and the secondary chamber (5). The outlet for the melt from the secondary chamber (5) is provided in a water bath (19). The water bath (19) provides for a gas-tight closure. The water bath (19) communicates with the wet-type slag removing unit (6). The flue gases are withdrawn from the secondary chamber (5) via the outlet (20) and are purified and discharged in a manner known per se.

The material is charged into the annular shaft (3) via the hopper (12) and is evenly distributed through the rotation of the outer shell (8). The material in the annular shaft (3) is conically sloping to the inside from the bottom edge of the fixed inner shell (9) to the central outlet (4) of the primary chamber (2). In this way, the actual reaction chamber for the melting process is created. The flame (11) of the burner (7) effects the melting process. At the surface of the material a molten surface layer having a thickness of 2 cm to 5 cm is created. The melt flowing off leaves the primary chamber (2) through the central outlet (4) together with the flue gases. The melt drops through the secondary chamber (5) into the water bath (19) where it granulates. The wet-type slag removing unit (6) delivers the granules having a grain size<10 mm to the outside.

Figure 2:
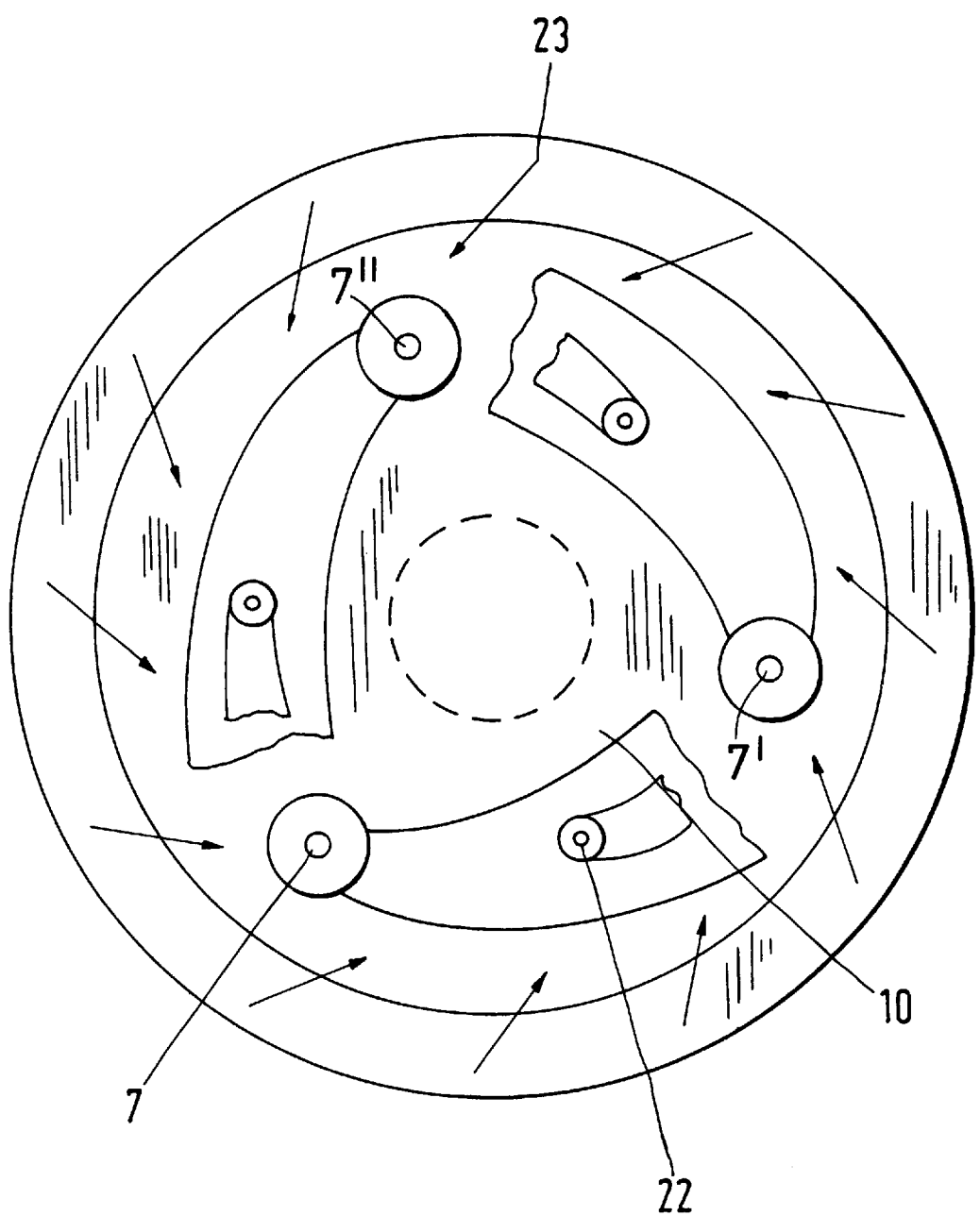
FIG. 2 shows the arrangement of three burners and inlet openings for secondary and tertiary air in a furnace roof of the primary chamber of the furnace.

FIG. 2 shows the arrangement of three burners (7, 7', 7") and three inlet openings (22, 22', 22") for secondary air as well as evenly distributed on the outer circle a plurality of inlet openings (23) for tertiary air in the furnace roof (10) of the primary chamber (2) of the furnace (1). The flames of the burners (7, 7', 7") are burning in the primary chamber (2).

EXAMPLE 1143 kg/h residual substance as dust from a domestic waste incineration plant, 429 kg/h residual substance as dust from an industrial waste incineration plant, and 200 kg/h used glass comminuted to a grain size<50 mm were mixed and continuously introduced into the primary chamber of a KSMF melting furnace having an inside diameter of 2 m. In the primary chamber a temperature of 1350° C. was set with an excess-air coefficient $\lambda=1.01$. The mixture had a melting point of 1260° C. The combustion air was preheated to 300° C. In the primary chamber the required melting energy was achieved through incineration of 630 kg/h activated coke and 60 kg/h oil. The activated coke was comminuted in a vibratory mill to a grain size<500 $\mu$m, 80 ÷<80 $\mu$m. The activated coke and the oil were mixed and introduced via three burners. In the secondary chamber an oxygen content of 6.5 vol.—% was set. The temperature of the waste gas from the primary chamber decreases in the secondary chamber to 1020° C. after a dwell time of 2 seconds. From the wet-type slag removing unit 1385 kg/h fusion granulate having a grain size of 1 mm to 5 mm were discharged. The fusion product had a density of 3 g/Nm$^3$. At the outlet of the secondary chamber 11000Nm$^3$/h waste gas were measured. The waste gas from the secondary chamber had a NO$_x$ content of 180 mg/Nm$^3$ and a CO content of 15 mg/Nm$^3$.

I claim:

1. A process for the disposal of residual substances from waste incineration plants as well as at least one of activated coke and activated carbon by surface-melting of a furnace charge where a) the residual substance is introduced into the primary chamber (2) of the furnace (1), b) at least one of the activated coke and activated carbon are comminuted to a grain size<1 mm and are directly blown into the primary chamber (2) via a burner (7), c) in the primary chamber (2) a temperature of 1250° C. to 1500° C. is set, d) a molten material flowing off from the surface of the furnace charge leaves the primary chamber (2) together with flue gases, the molten material is passed through a secondary chamber (5) and is discharged as slag.

2. The process as claimed in claim 1, wherein in accordance with process step (c) a temperature of 1300° C. to 1400° C. is set.

3. The process as claimed in claim 1, wherein at least one of the activated coke and activated carbon are mixed with rust ash, and the mixture including the residual substance is introduced into the primary chamber (2) or the mixture is directly introduced into the primary chamber (2).

4. The process as claimed in claim 3, wherein rust ash is separated from iron-containing substances in a magnetic separator, the rust ash separated from iron-containing substances is screened, where a coarse fraction having a grain size>50 mm is separated and a fine fraction having a grain size<50 mm is introduced into the primary chamber (2).

5. The process as claimed in claim 3, wherein the fine fraction having a grain size<50 mm is screened and a fraction having a grain size of 2 mm to 50 mm is separated and a fraction having a grain size<2 mm is introduced into the primary chamber (2).

6. The process as claimed in claim 1, wherein in the primary chamber (2) an excess-air coefficient of $\lambda=0.7$ to $\lambda=1.3$ is set.

7. The process as claimed in claim 1, wherein oxygen-enriched air is introduced into the furnace (1).

8. An apparatus for the disposal of residual substances from waste incineration plants as claimed in claim 1, where in the furnace roof (10) of the primary chamber (2) of the furnace (1) one or several burners (7) are disposed and at one or several points (22) of the furnace roof (10) secondary air is introduced into the primary chamber (2) and at one or several points (23) of the furnace roof (10) tertiary air is introduced into the primary chamber (2).

* * * * *